(12) United States Patent
Lassota

(10) Patent No.: US 6,499,628 B1
(45) Date of Patent: Dec. 31, 2002

(54) INSULATED URN WITH HEAT RETENTIVE CLOSURE AND METHOD

(75) Inventor: Zbigniew G. Lassota, Long Grove, IL (US)

(73) Assignee: Food Equipment Technologies Company, Inc., Lincolnshire, IL (US)

( * ) Notice: Subject to any disclaimer, the term of this patent is extended or adjusted under 35 U.S.C. 154(b) by 0 days.

(21) Appl. No.: 09/303,186

(22) Filed: Apr. 30, 1999

(51) Int. Cl.[7] ............................................... G01F 11/00
(52) U.S. Cl. ..................... 222/1; 222/109; 222/473; 222/475.1; 222/555; 222/564
(58) Field of Search .................... 222/1, 109, 465.1, 222/472, 473, 475.1, 548, 555, 564

(56) References Cited

U.S. PATENT DOCUMENTS

| | | | |
|---|---|---|---|
| 5,273,194 | * 12/1993 | McNamara | 222/548 |
| 5,497,917 | * 3/1996 | Krimmel et al. | 222/475.1 |
| 5,653,362 | * 8/1997 | Patel | 222/475.1 |
| 5,988,457 | * 11/1999 | Andrew et al. | 222/475.1 |

* cited by examiner

*Primary Examiner*—Joseph A. Kaufman
(74) *Attorney, Agent, or Firm*—James W. Potthast; Potthast & Associates

(57) ABSTRACT

An insulating, serving urn assembly(10) with an extra closure assembly(40) releasably mounted within the neck(28) of an urn body(22) for reducing the loss of heat from within the urn during brewing of beverage into the urn assembly (10) by passing the beverage into the urn body through a relatively small drain opening(73) of a brew guide(46) mounted to an extra closure member(42) that closes off the inner opening(26) of the urn. After,brewing is complete but before serving from the urn assembly(10), the beverage is additionally insulated by a lid(36) that fits over the outer opening(24) of the urn assembly(10) and a brew guide closure(76) that is mounted to the underside(36B) of the lid(36). During service a relatively small, extra closure service opening (50) located adjacent to a spout (34) in the extra closure member(42) is opened with movement of a rotatably mounted door(44) to an open position to enable pouring out of the beverage while still covering most of the inner opening(26). The drain hole(73) is located asymmetrically opposite of the extra closure opening and the spout(36) to prevent its submersion into the beverage and functions as an air hole during pouring to enhance smooth flow.

34 Claims, 4 Drawing Sheets

INSULATED URN WITH HEAT RETENTIVE CLOSURE AND METHOD

BACKGROUND OF THE INVENTION

This invention generally relates to beverage urns and more particularly to insulated beverage urns and methods of using insulated beverage urns to brew into and distribute beverage with an insulated beverage urn.

Insulated beverage urns such as used to temporarily store and serve hot coffee or hot water for tea are well known. It is also known to brew hot beverage, such as hot coffee, directly into the insulated urn rather than first brewing the coffee into a larger intermediate container and then dispensing the coffee into the urn through a spigot. This is done to ensure that the coffee enters the insulated urn in its freshest and hottest state after just passing through the coffee grounds. If coffee is kept heated artificially for very long in a separate intermediate it deteriorates with respect to desirable flavor and aroma, and if not heated looses heat until the temperature is too low for acceptable coffee service.

An excessive heat loss problem with known coffee urns of the type which are designed for direct receipt of freshly brewed beverage, or direct brew coffee urns, has been noted by the present inventor. Those with lid closures have large mouth openings that are open not only during the brew flow period during which hot water is continuously added to the brew basket that contains the ground coffee or other ingredient within a filter through which the hot water seeps but remain open during two to three minutes of so-called "dripping time". During dripping time, it has been observed that with the temperature of the beverage drops approximately 25 degrees Farenheit from approximately 190 degrees to approximately 165 degrees due to heat loss through the open top. Even after the dripping time is over and the lid is closed for temporary storage, heat continues to be lost through the spout opening and trough the lid itself which is often not well insulated.

SUMMARY OF THE INVENTION

It is therefore an objective of the present invention to provide an insulated coffee urn assembly and method of using coffee urn assembly to reduce heat loss during direct brewing into the urn, during dripping time and during waiting time.

This objective is achieved in part by provision of a beverage urn assembly with an insulated body with a supportive bottom, an open top portion with an upper urn opening, and a lower, inner urn opening, a neck extending between the upper top opening and the lower urn opening, and an enclosing inner insulating side wall extending between the bottom and the inner urn opening to define an interior insulated space communicating with the inner urn opening for receipt and insulated storage of a beverage; an insulating extra closure assembly fitted within the neck between the upper opening and inner opening, and having an insulating extra closure member closing passage through the neck except through an extra closure opening that is substantially smaller than the inner opening, and an extra closure opening door movably mounted to the extra closure member for movement between a closed position in which movement of fluid and gases through the extra closure opening are blocked, and an open position in which the movement of beverage and gases through the extra closure opening are not blocked.

The objective is also achieved in part by providing a hot beverage urn assembly with an insulated body having a supportive bottom, an open top portion with an upper urn opening, and a lower, relatively smaller inner urn opening, a neck extending between the upper urn opening and the lower inner urn opening, and an enclosing inner insulating side wall extending between the bottom and the inner opening to define an interior insulated space communicating with the inner entrance opening for receipt and insulated storage of a beverage; and an insulating extra closure assembly snugly fitted within the neck between the inner opening and the spout including an insulating extra closure member mounted snugly within the neck and having a closure opening, said closure opening being substantially smaller than the inner opening, said insulating closure member closing passageway through the neck except through the substantially smaller closure opening to reduce thermal transfer, and a brew guide mounted to the closure member and having a drain hole for passing beverage into the interior insulated space, said drain hole being located to provide an inlet for air during pouring of the beverage from the interior insulated space.

In the preferred embodiment of the insulated urn assembly the brew guide has a a brew guide inlet opening located opposite of the outlet drain hole, said drain hole being substantially smaller than the brew guide inlet opening, and a substantially solid tapered wall assembly with a bottom wall that extends generally inwardly and downwardly and away from the extra closure opening and the brew guide inlet opening to the drain hole in a funnel-like fashion, said drain hole being asymmetrically located to prevent blockage by the beverage during pouring, and means for mounting the brew guide to the extra closure assembly. Preferably, another closure is provided as a lid pivotally mounted to the upper portion for movement between a closed position in which the upper opening is covered by the lid, and an open position in which the upper opening is uncovered, and in which the brew guide is mounted to the extra closure assembly with the brew guide inlet opening located beneath the upper opening to enable movement of the lid to the closed position.

In addition, in the preferred embodiment the beverage urn assembly includes a brew guide closure for closing the brew guide against passage of steam and hot air through the drain hole when operatively engaged with the brew guide. The lid that is pivotally mounted to the top portion of the insulated body has an outer side that faces away from the outer opening and an opposite inner side the brew guide closure is mounted to the inner side of the lid to be carried by the lid into operative engagement with the brew guide to close the brew guide when the lid is moved to the closed position. Preferably, the brew guide closure is a plug that fits snugly into the brew guide to close the brew guide against the escape of steam and hot air from the interior insulated space through the funnel drain hole.

An advantageous feature of the invention is that the extra closure member and the brew guide attached to the extra closure member are releasably attached to the neck and the extra closure member is releasably attached to the neck by means of a releasable connection to a mounting member carried by an interior surface of the neck between the top opening and the inner opening. This enables easy removal for cleaning or replacement.

Another advantageous feature is that the extra closure assembly is provided with a closure opening door movably mounted to the extra closure member for movement between a closed position in which movement of fluid and gases through the extra closure opening are blocked, and an open position in which the movement of beverage and gases through the extra closure opening are not blocked.

In accordance with the preferred method of serving freshly brewed beverage the beverage is passed directly into an inner urn opening of an insulated urn having an insulated interior by passing the beverage through a drain hole substantially smaller than the inner urn opening of a concave brew guide of an extra closure assembly that is mounted in blocking relationship within the inner urn opening to reduce thermal loss from the interior of the urn during filling of the urn with beverage. The outer lid is returned to a closed position to close an upper urn opening located above the inner urn opening and above the extra closure assembly and the brew guide. The urn is then moved from a brewing location to serving location, and the door to the extra closure opening of the extra closure member that is substantially smaller than the inner opening is opened and beverage is poured out of the interior of the urn through the inner urn opening, through the extra closure opening and out of the upper opening at the serving location after the door has been opened.

Preferably, the method includes the step of closing the door to the extra closure member while passing the freshly brewed beverage into the urn to reduce loss from within the urn and closing the brew guide with a closure after the urn has been filled and before serving.

BRIEF DESCRIPTION OF THE DRAWINGS

The foregoing advantageous features of the invention are described in detail and other features are made apparent from a detailed description of one ebodiment of the invention that is given with reference to the several figures of the drawing, in which.

DETAILED DESCRIPTION

Figure 1:
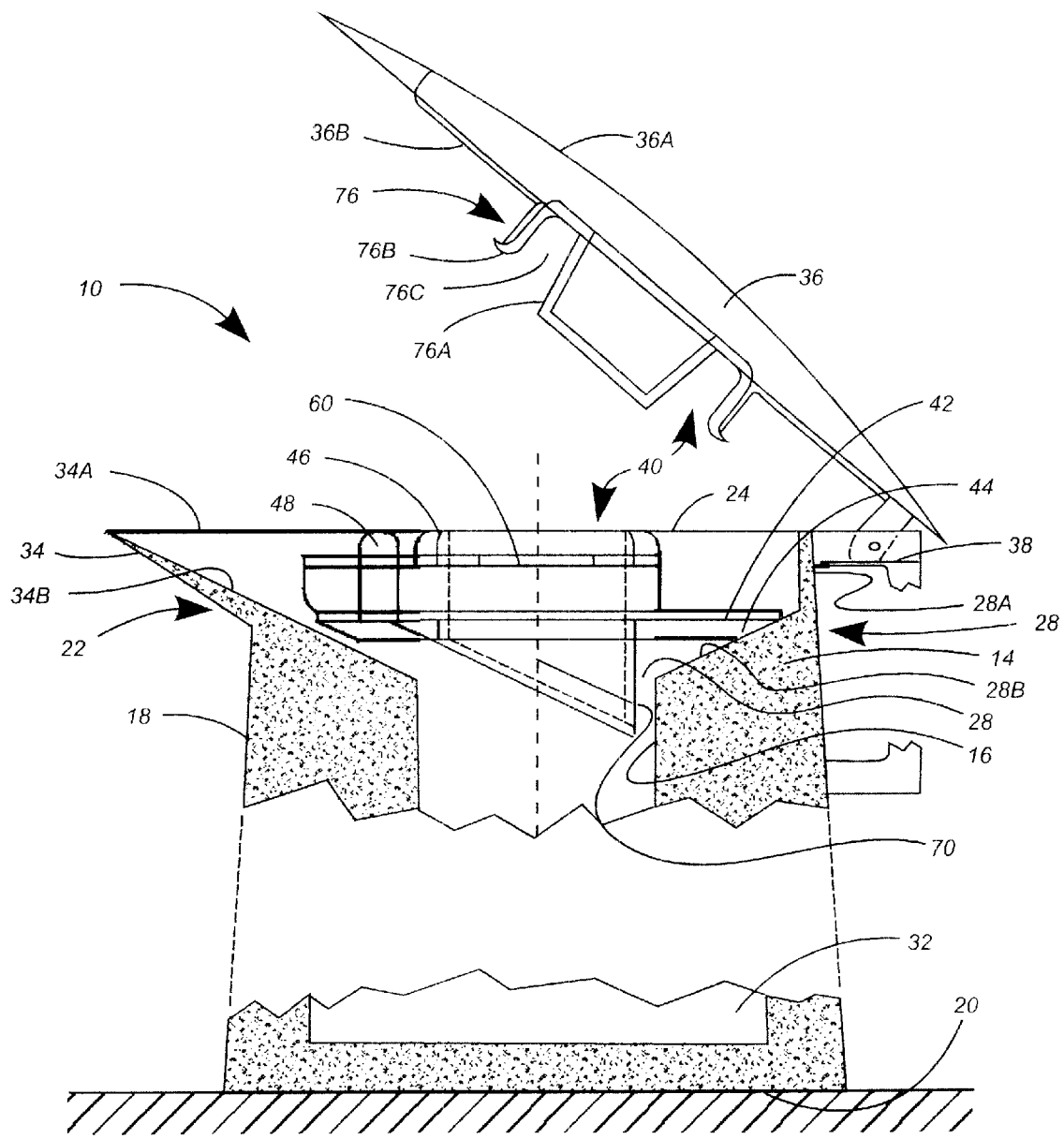
FIG. 1 is a schematic cross-sectional side view of a preferred embodiment of the insulated urn assembly of present invention with the extra closure member, closure opening door and brew guide mounted within the neck and beneath an open upper opening that is closable with a pivotally mounted lid.

Referring now to FIG. 1, the preferred embodiment of the serving beverage urn assembly 10 is seen to include an insulated body 12 with a double wall construction filled with suitable insulation 14. The inner wall 16 is made of glass and the outer wall 18 is made of stainless steel. The urn assembly, or server, 10 rests on a generally flat supportive bottom 20. An upper, open top portion 22 includes an upper urn opening 24 and a lower, inner urn opening 26. A neck 28 with a circular collar 28A joined to a conical wall 28B extends between the upper opening 24 and the lower urn opening 26.

An enclosing inner insulating side wall extends between the bottom 20 and the inner urn opening 26 to define an interior insulated space 32 communicating with the inner urn opening 26 for receipt and insulated storage of a beverage.

A spout 34 extends laterally, radially outwardly from a location at the side of the neck 28. The spout has an open top 34A facing upwardly and a pour support 34B surface that merges smoothly with the conical wall 28B of the neck 28.

A lid 36 is pivotally mounted to a mounting section of a side handle 38 for movement between an open position, as generally shown in FIG. 1, to a closed position in which the it snugly overlies and closes the upper urn opening 24 and the upwardly facing open top 34A of the spout.

In accordance with the present invention, an insulating extra closure assembly 40 that is fitted within the neck 28 between the upper urn opening 24 and the urn inner opening 26. The extra closure assembly functions to provide insulating closure to the inner opening 26 at all times. When the lid 36 is in a closed position, closing the upper opening 24 during standby after the urn assembly has been filled with hot beverage and before it is time to serve the beverage, to the extra closure assembly reduces the loss of heat through the lid. During direct brewing of beverage into the urn assembly 10, the extra closure assembly 40 reduces the loss of heat during the brew period and afterwards during the dripping period. Even during service, the extra closure assembly although opened sufficiently to allow pouring still covers a large portion of the inner urn opening 26 to reduce heat loss. All the components of the extra closure assembly are made of molded insulating, washable, temperature resistant, plastic that is approved for direct contact with food by the FDA, such as ABS or polypropylene.

Figure 2A:
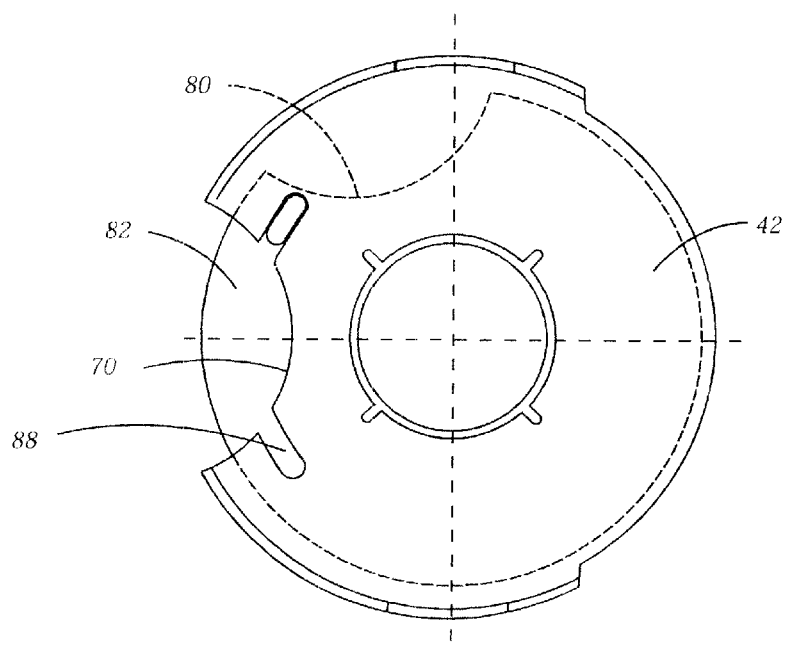
FIG. 2A is a plan view of the extra closure member with the brew guide mounted thereto and with the closure opening door in a closed position preferred during brewing and temporary storage before serving to reduce heat loss.
Figure 2B:
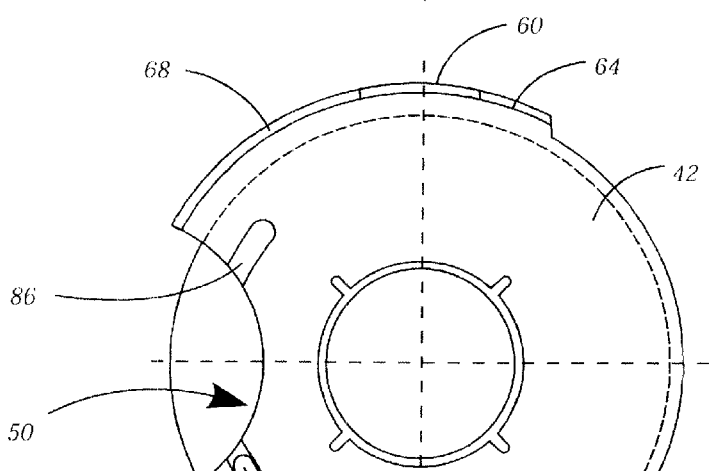
FIG. 2B is a plan view of the extra closure member with the brew guide mounted thereto and with the closure opening door in an open position needed for serving.
Figure 3A:
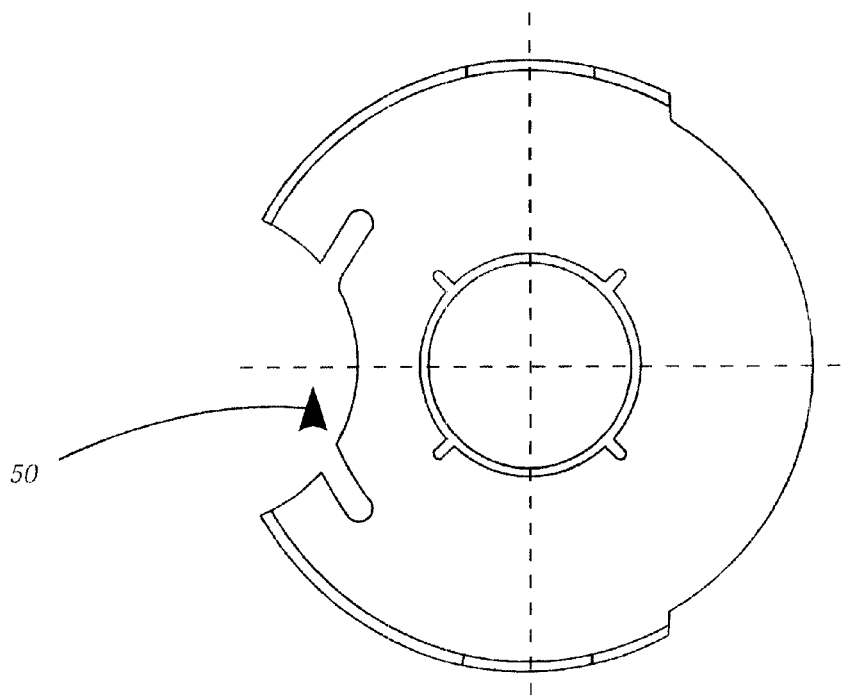
FIG. 3A is a plan view of the extra closure member with the brew guide releasably mounted in a central brew guide mounting hole of the closure member but without the closure door.
Figure 3B:
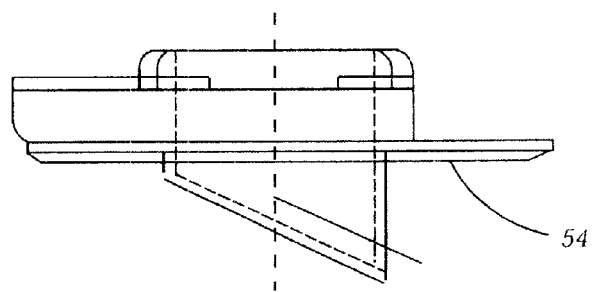
FIG. 3B is a sectional side view of the assembly of FIG. 3A.

The extra closure assembly 40 includes an insulating extra closure member 42 with an integrally formed brew guide 44 and an extra closure opening door 44 with a door handle and guide post 48. The passage of beverage through the neck 28 is allowed only through an extra closure opening 50 as seen in FIGS. 2A, and 3A, that is substantially smaller than the inner opening 26, only when the door 44 in not closing the extra closure opening 50. The extra closure opening door 44 is movably mounted to the extra closure member 42 for movement between an open position and a closed position in which movement of fluid and gases through the extra closure opening are blocked. This closed position is shown in FIG. 2A. In the open position, as shown in FIG. 2B, the movement of beverage and gases through the extra closure opening are not blocked to enable serving of the beverage by pouring it through the spout 34.

Figure 4A:
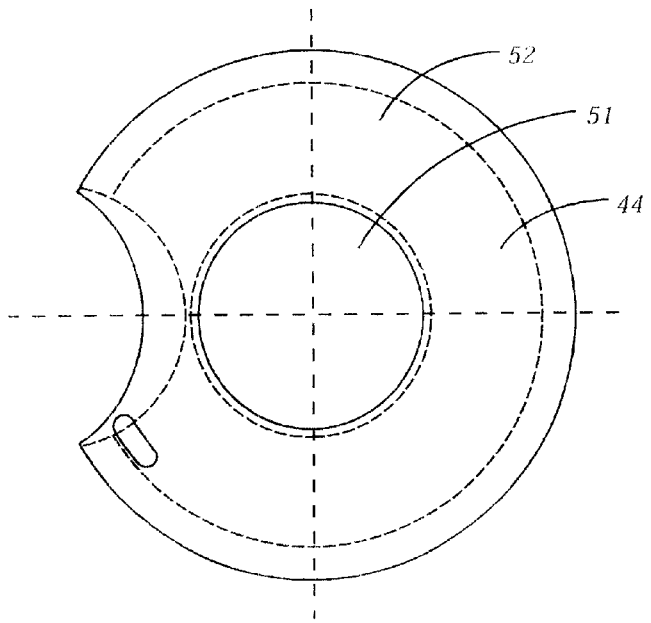
FIG. 4A is a plan view of the extra closure member opening door apart from the extra closure member.
Figure 4B:
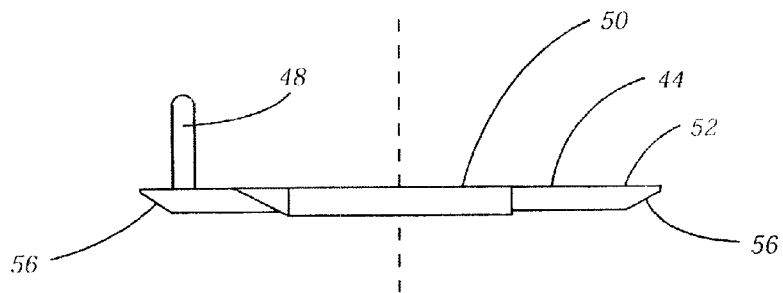
FIG. 4B is a side view of the door of FIG. 4A.

Still referring to FIG. 1, the extra closure member 42 mounted in generally abutting relationship with the neck 28. Specifically, referring to FIGS. 4A and 4B, the closure door 44 has a central, circular brew guide mounting hole 51 within which the brew guide 46 is rotatably received, and an upper surface of a disc-like collar 52 that provides underlying support for a flat disc-like bottom 54 of the extra closure member 42. The door 44 has a beveled circular edge 56 that seals against the conical wall 28B and is supported thereby.

When mounted within the neck 28, the extra closure member opening 50 is located adjacent the spout 34 to direct beverage to the spout 34 when the opening 50 is opened for service. The neck 28 carries a pair of diametrically exposed mounting members, or ears, 60, FIG. 1, that extend radially inwardly from the interior surface of the collar 28 of the neck 28. The extra closure assembly has a pair of opposed upstanding arms with top surfaces that slide beneath and are respectively engageable with the mounting members 60 to releasably lock the extra closure member to the neck 28. This presses the door 44 between the bottom of the extra closure member and the conical wall 28 B to enhance the snug sealing relationship of the closure assembly with the neck 28. Relatively elevated portions 66 and 68 of the upstanding arms defined shoulders with the locking surfaces that fit beneath the ears 60 that abut against the ears 60 to block further rotation once the extra closure opening is positioned adjacent the location of the spout 34.

Figure 2C:
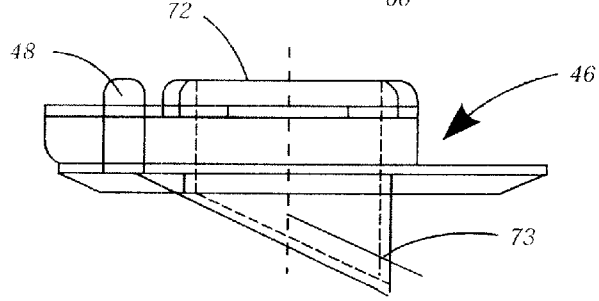
FIG. 2C is a side view of the assemblies of FIGS. 2A and 2B.

Referring to FIG. 2C, the brew guide is integrally mounted to and formed as part of the insulating extra closure member 42. Advantageously, it has a drain hole that is asymmetrically located diametrically opposite of the closure opening 50. This asymmetric location keeps the drain hole 73 from being submerged during pouring to enable the drain hole 73 to function as an inlet for necessary air during pouring of the beverage from the interior insulated space. The brew guide has a brew guide inlet opening 72 located opposite of the outlet drain hole 73 and the drain hole is only approximately one fourth inch in diameter and substantially smaller than the brew guide inlet opening 72 that is approximately 1¾ inch in diameter. The brew guide 46 has a substantially solid tapered wall assembly with a bottom wall 74 that extends generally inwardly and downwardly and away from the extra closure opening 50 and the brew guide inlet opening 50 to the drain hole 73 in a funnel-like fashion.

Advantageously, the brew guide 46 is mounted to the extra closure assembly 40 with the brew guide inlet opening 72 located beneath the upper opening 24 to enable movement of the lid 36 to the closed position.

Referring to FIG. 1 again, the extra closure assembly 40 includes a brew guide closure 76 for closing the brew guide 46 against passage of steam and hot air through the drain hole 70 when operatively engaged with the brew guide 46. The lid 36 has an outer side 36B that faces away from the outer opening 24 and an opposite inner side 36B. Mounted to the underside 36B of the lid 36, preferably by being integrally formed therewith of insulating plastic, is the brew guide closure 76 at a generally central location to be carried by the lid 36 into operative engagement with the brew guide 46 to close the brew guide 46 when the lid is moved to the closed position.

Preferably, the brew guide closure 76 is a plug with a tapered plug body 76A that fits snugly into the brew guide to close the brew guide inlet opening 72 against the escape of steam and hot air from the interior insulated space through the funnel drain hole 73. An annular wall 76B surrounding the plug body 76A to define an annular channel 76C. When the closure 76 is in operative closing relationship with the brew guide the annular upstanding circular wall surrounding and defining the inlet opening 72 is received within the channel 76C while the top of the annular wall is pressed against the bottom of the channel to insure a good seal and tight insulated closure for the inner opening 24.

Referring to FIGS. 2A, 2B and 2C, the extra closure opening 70 is closed is closed by the extra closure opening door 44 when it is rotated about the circular portion of the brew guide 46 received within central opening 51 relative to the extra closure member 42 to the position shown in FIG. 2A. In this closed position a cutout opening 80 at the perimeter of the disc portion of the door 42 is moved out of alignment with the closure opening 70 and a portion 82 of the disc is moved into blocking, closing relationship with the closure opening 70. When in a closed position movement of fluid and gases through the extra closure opening are blocked. When moved to the open position, the cutout 80 is aligned with the opening 70 which is also preferably also a cutout as shown in FIG. 2B. In the open position movement of beverage and gases through the extra closure opening 70 are not blocked to permit puring, but heat loss during pouring is still reduced due to the closure opening being substantially smaller than the inner opening 26.

Preferably, the extra closure opening door 44 is slideably mounted to the extra closure member for movement between the open and closed positions. The extra closure member 42 and the closure opening door 44 have contiguous planer surfaces that slide relative to one another. Both of the extra closure member and the closure opening door are discs. As best seen if FIGS. 4A,B and C, the disc of the closure opening door 44 lies in a plane and has an upstanding post, or door handle, 48 extending transversely from the plane of the upper surface of the disc portion of the door 44. The disc of the extra closure member 42 has a pair of arcuate slots 86 and 88 within which the post 48 is received for guiding receipt of the post 48. The post slides within the slots 86 and 88 during relative rotary movement of the discs. The axis of rotation is defined by the circular cross-section portion of the brew guide mounted within the central circular opening 51.

In accordance with them method of the present invention, freshly brewed fresh beverage is served by using the urn assembly 10 by performing the steps of passing the freshly brewed beverage directly into an inner urn opening of an insulated urn having an insulated interior by passing the beverage through a drain hole substantially smaller than the inner urn opening of a concave brew guide of an extra closure assembly that is mounted in blocking relationship within the inner urn opening to reduce thermal loss from the interior of the urn during filling of the urn with beverage; closing an outer lid to close an upper urn opening located above the inner urn opening and the extra closure assembly and the brew guide; moving the urn from a brewing location to serving location; opening a door to an extra closure opening of the extra closure member that is substantially smaller than the inner opening; and pouring beverage out of the interior of the urn through the inner urn opening, through the extra closure opening and out of the upper opening at the serving location after the door has been opened.

The method also includes other steps. The door to the extra closure member is closed while passing the freshly brewed beverage into the urn to reduce loss from within the urn. The brew guide is closed with a closure when beverage is not being brewed into the brew guide. The brew guide closure 76 is preferably moved into operative closing engagement with the brew guide 46 with movement of the lid 36 to the closed position to close the upper urn opening 24. Passage to a spout is blocked with the extra closure member during temporary storage standby.

While a particular embodiment has been disclosed in detail for purposes of explaining the best mode of practicing the invention, the invention is not limited to the details of the preferred embodiment but rather is defined by the appended claims to which reference should be made.

What is claimed is:
1. A beverage urn assembly, comprising:
  an insulated body with
    a supportive bottom,
    an open top portion with
      an upper urn opening, and a lower, inner urn opening,
a neck extending between the upper top opening and the lower urn opening, and
an enclosing inner insulating side wall extending between the bottom and the inner urn opening to define an interior insulated space communicating with the inner urn opening for receipt and insulated storage of a beverage;
an insulating extra closure assembly fitted within the neck between the upper opening and inner opening, and having
an insulating extra closure member closing passage through the neck except through an extra closure opening that is substantially smaller than the inner opening, and
an extra closure opening door movably mounted to the extra closure member for movement between
a closed position in which movement of fluid and gases through the extra closure opening are blocked, and
an open position in which the movement of beverage and gases through the extra closure opening are not blocked.

2. The beverage urn assembly of claim 1 in which the extra closure opening is a cutout from an edge of the extra closure member that is otherwise mounted in generally abutting relationship with the neck.

3. The beverage urn assembly of claim 1 including a spout extending laterally from a location adjacent the upper opening and in which the extra closure member opening is located adjacent the spout to direct beverage to the spout.

4. The beverage urn assembly of claim 1 in which the neck has a mounting member and the extra closure assembly has a surface engageable with the mounting member to releasably attach the closure assembly within and in snug sealing relationship with the neck.

5. The beverage urn assembly of claim 1 in which the extra closure member includes a brew guide mounted to the insulating extra closure member and having a drain hole that is asymetrically located opposite of the closure opening.

6. The beverage urn assembly of claim 1 in which the extra closure opening door is slideably mounted to the extra closure member for movement between the open and closed positions.

7. The beverage urn assembly of claim 6 in which the extra closure member and the closure opening door have contiguous planer surfaces that slide relative to one another.

8. The beverage urn assembly of claim 7 in which both of the extra closure member and the closure opening door are discs with peripheral cutouts that define the open position of the closure opening when rotated into co-alignment.

9. The beverage urn assembly of claim 8 in which the disc of the closure opening door lies in a plane and has a post extending transversely from the plane, and the disc of the extra closure member has at least one arcuate slot for guiding receipt of the post, said post sliding within the slot during relative arcuate movement of the discs.

10. The beverage urn assembly of claim 9 in which the disc of the door has a central circular opening and including a brew guide carried by the extra closure member with a circular cross-section releasably mounted within the central circular opening.

11. A hot beverage urn assembly, comprising:
an insulated body with
a supportive bottom,
an open top portion with
an upper urn opening, and
a lower, relatively smaller inner urn opening,
a neck extending between the upper urn opening and the lower inner urn opening, and
an enclosing inner insulating side wall extending between the bottom and the inner opening to define an interior insulated space communicating with the inner entrance opening for receipt and insulated storage of a beverage; and
an insulating extra closure assembly snugly fitted within the neck between the inner opening and the spout including
an insulating extra closure member mounted snugly within the neck and having a closure opening,
said closure opening being substantially smaller than the inner opening,
said insulating closure member closing passageway through the neck except through the substantially smaller closure opening to reduce thermal transfer, and
a brew guide mounted to the closure member and having a drain hole for passing beverage into the interior insulated space, said drain hole being located to provide an inlet for air during pouring of the beverage from the interior insulated space.

12. The insulated urn assembly of claim 11 in which the brew guide has
a brew guide inlet opening located opposite of the outlet drain hole, said drain hole being substantially smaller than the brew guide inlet opening, and
a substantially solid tapered wall assembly with a bottom wall that extends generally inwardly and downwardly and away from the extra closure opening and the brew guide inlet opening to the drain hole in a funnel-like fashion, said drain hole being asymmetrically located to prevent blockage by the beverage during pouring, and
means for mounting the brew guide to the extra closure assembly.

13. The beverage urn assembly of claim 11 including
a lid pivotally mounted to the upper portion for movement between
a closed position in which the upper opening is covered by the lid, and
an open position in which the upper opening is uncovered, and in which
the brew guide is mounted to the extra closure assembly with the brew guide inlet opening located beneath the upper opening to enable movement of the lid to the closed position.

14. The beverage urn assembly of claim 13 including a brew guide closure for closing the brew guide against passage of steam and hot air through the drain hole when operatively engaged with the brew guide.

15. The beverage urn assembly of claim 14 including
a lid pivotally mounted to the top portion of the insulated body, said lid having an outer side that faces away from the outer opening and an opposite inner side, and
means for mounting the brew guide closure to the inner side of the lid to be carried by the lid into operative engagement with the brew guide to close the brew guide when the lid is moved to the closed position.

16. The beverage urn assembly of claim 14 in which the brew guide closure is a plug that fits snugly into the brew guide to close the brew guide against the escape of steam and hot air from the interior insulated space through the funnel drain hole.

17. The beverage urn assembly of claim 13 in which the brew guide has a generally enclosing side wall extending along a symetrical axis and a generally closed bottom that is slanted relatively to the axis downwardly away from the brew guide inlet opening and the closure member opening and toward the drain hole, said closure member opening being on one side of the symmetrical axis and the drain hole being located at an opposite side of the axis.

18. The beverage urn assembly of claim 17 in which the drain hole is located in the side wall adjacent a point on the slanted closed bottom generally farthest from the inlet opening and generally opposite of the extra closure opening.

19. The beverage urn assembly of claim 13 in which the extra closure member has a center, and the brew guide is mounted at the center of a brew guide mounting hole in the lid.

20. The beverage urn assembly of claim 11 in which the brew guide is fixidly attached to the mounting member.

21. The beverage urn assembly of claim 11 in which the lid has a central brew guide mounting hole and the brew guide is releasably and rotatably mounted within the guide mounting hole.

22. The beverage urn assembly of claim 21 in which the extra exclosure mounting member and the brew guide attached to the mounting member are releasably attached to the neck.

23. The beverage urn assembly of claim 11 in which said neck has a spout on one side extending laterally outwardly from, and contiguous with, the upper top opening, and said extra closure member opening is located adjacent to the spout and opposite the drain hole.

24. The beverage urn assembly of claim 23 in which the drain hole is asymmetrically located in a side wall of the brew guide adjacent a point on a slanted closed bottom of the brew guide that is generally farthest from the inlet opening and generally opposite of the extra closure opening and the spout.

25. The beverage urn assembly of claim 11 in which the extra closure member and the brew guide attached to the extra closure member are releasably attached to the neck.

26. The beverage urn assembly of claim 25 in which the extra closure member is releasably attached to the neck by means of a releasable connection to a mounting member carried by an interior surface of the neck between the top opening and the inner opening.

27. The hot beverage urn assembly of claim 11 in which the mounting member is releasably attached to the neck by means of a connection to the mounting member carried by an interior surface of the neck between the top opening and the inner opening.

28. The beverage urn assembly of claim 11 in which the extra closure assembly of claim 11 includes an extra closure opening door movably mounted to the extra closure member for movement between a closed position in which movement of fluid and gases through the extra closure opening are blocked, and an open position in which the movement of beverage and gases through the extra closure opening are not blocked.

29. The beverage urn of claim 11 in which all of the insulated extra closure assembly is made of insulating plastic suitable for direct contact with food without contamination.

30. A method of serving a freshly brewed fresh beverage, comprising the steps of:

passing the freshly brewed beverage directly into an inner urn opening of an insulated urn having an insulated interior by passing the beverage through a drain hole substantially smaller than the inner urn opening of a concave brew guide of an extra closure assembly that is mounted in blocking relationship within the inner urn opening to reduce thermal loss from the interior of the urn during filling of the urn with beverage;

closing an outer lid to close an upper urn opening located above the inner urn opening and the extra closure assembly and the brew guide;

moving the urn from a brewing location to serving location;

opening a door to an extra closure opening of the extra closure member that is substantially smaller than the inner opening; and pouring beverage out of the interior of the urn through the inner urn opening, through the extra closure opening and out of the upper opening at the serving location after the door has been opened.

31. The method of claim 30 including the step of closing the door to the extra closure member while passing the freshly brewed beverage into the urn to reduce loss from within the urn.

32. The method of claim 30 including the step of closing brew guide with a closure.

33. The method of claim 32 including the step of carrying the brew guide closure into operative closing engagement with the brew guide with movement of a lid to a closed position closing the upper urn opening.

34. The method of claim 30 including the step of blocking passage to a spout with the extra closure member.

* * * * *